United States Patent
Webber et al.

(10) Patent No.: US 6,880,057 B1
(45) Date of Patent: *Apr. 12, 2005

(54) SPLIT WRITE DATA PROCESSING MECHANISM FOR MEMORY CONTROLLERS UTILIZING INACTIVE PERIODS DURING WRITE DATA PROCESSING FOR OTHER TRANSACTIONS

(75) Inventors: Thomas P. Webber, Petersham, MA (US); Ketan P. Joshi, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/478,140

(22) Filed: Jan. 5, 2000

Related U.S. Application Data

(63) Continuation of application No. 08/884,844, filed on Jun. 30, 1997, now Pat. No. 6,061,772.

(51) Int. Cl.[7] .............................................. G06F 12/00
(52) U.S. Cl. ...................... 711/169; 711/168; 711/154; 711/201
(58) Field of Search ................................ 711/105, 123, 711/154, 157, 167, 168, 169, 201

(56) References Cited

U.S. PATENT DOCUMENTS

| | | | | |
|---|---|---|---|---|
| 5,535,345 A | | 7/1996 | Fisch et al. ................. | 395/309 |
| 5,584,009 A | * | 12/1996 | Garibay, Jr. et al. ........ | 711/117 |
| 5,615,402 A | * | 3/1997 | Quattromani et al. ......... | 712/38 |
| 5,732,244 A | | 3/1998 | Gujral ........................ | 711/141 |
| 5,740,398 A | * | 4/1998 | Quattromani et al. ....... | 711/117 |
| 5,841,598 A | | 11/1998 | Horiuchi et al. .............. | 360/31 |
| 5,907,860 A | * | 5/1999 | Garibay, Jr. et al. ........ | 711/117 |

OTHER PUBLICATIONS

Hennessy and Patterson, "Computer Architecture A Quantitative Approach," pp. 414–416, Morgan Kaufmann Publishers, Inc., 1990.

* cited by examiner

*Primary Examiner*—Tuan V. Thai
(74) *Attorney, Agent, or Firm*—Conley, Rose & Tayon, PC; B. Noël Kivlin

(57) ABSTRACT

A memory controller provides fast processing of sequential split memory access instructions which include a split write instruction. In a split write instruction, a write address and write request are provided to the memory controller in an initial transaction while write data can be provided to the memory controller in a later transaction. The memory controller includes a sideline buffer, for buffering incomplete write instructions, and memory control logic which ensures proper execution of the sequential memory access instructions. Upon receiving an incomplete write instruction, the memory control logic stores the corresponding write request and write address in the sideline buffer until corresponding write data becomes available. The memory control logic determines if there is overlap between memory space to be occupied by an initial write data block and memory space to be occupied by a subsequent read data block or second write data block, of a read or write instruction respectively. By using a sideline buffer to temporarily store incomplete write instructions, processing of sequential memory access instructions can continue subject to observance of memory access conflict rules.

18 Claims, 4 Drawing Sheets

SPLIT WRITE DATA PROCESSING MECHANISM FOR MEMORY CONTROLLERS UTILIZING INACTIVE PERIODS DURING WRITE DATA PROCESSING FOR OTHER TRANSACTIONS

This application is a Continuation of Ser. No. 08/984,844 filed Jun. 30, 1997 now U.S. Pat. No. 6,061,772.

FIELD OF THE INVENTION

The present invention pertains to computer memory controllers and, in particular, to a particularly efficient mechanism for effecting read and write operations in a split transaction memory system.

BACKGROUND OF THE INVENTION

A typical memory system includes a memory storage device and a memory controller. Memory storage devices can include, without limitation, randomly accessible memory (RAM) devices and memory storage devices which include storage media such as magnetic and/or optical disks. Dynamic RAM (DRAM), is an example of a memory storage device which is commonly used in computer systems.

Memory controller devices typically receive memory access instructions from a processor unit such as, for example, a central processing unit (CPU). Program instructions executed by a processor typically require that memory access instructions issued to a memory controller be executed by the memory controller in the particular sequence in which the memory access instructions are received by the memory controller. For example, a read instruction which retrieves data stored in a memory location written to by a previously issued write instruction is expected to retrieve the data stored in execution of the write instruction. In other words, the previously write instruction is expected to execute before the subsequently issued read instruction. If the relative order of execution of the write and read instructions is not preserved, the data retrieved by execution of the read instruction varies depending on the relative order of execution of the write and read instructions. Such leads to unpredictable behavior of computer processes. Therefore, memory access operations are typically performed in sequence to maintain data integrity and computer process predictability.

In a split memory access transaction, a single memory access instruction can be issued in multiple parts. For example, a request for memory access and corresponding memory address can both be issued for a processor to a memory controller in a first transaction and data corresponding to the request and memory address can be issued from the processor to the memory controller in a second, subsequent transaction. Such split memory access transactions are typically split write instructions since a write instruction typically requires both a destination memory address and write data to be written to the destination address. Accordingly, the destination address can be transmitted to a memory controller along with an instruction specifying a write operation in a first transaction while the write data can be transmitted to the memory controller in a subsequent transaction. Read instructions typically specify a source address and an instruction specifying a read operation. Transmission of read data to the memory controller is generally unnecessary since the data transfer of the read operation is from the memory to the processor. Accordingly, read instructions are typically considered complete by the memory controller since all information required to execute a read instruction is received when the read request and source address are received.

A split write instruction typically requires that the write instruction is complete prior to execution of the write instruction by the memory controller. Specifically, the memory controller generally cannot execute a split write instruction until the requisite write data is received in a subsequent transaction. Because the write data in a split write instruction is often provided in a subsequent transaction than the write instruction and destination address, processing of a split write instruction can require a write data stall period. As used herein, a write data stall period refers to a period of inactivity of a memory controller while the memory controller waits for receipt of the write data of a split write instruction. Conversely, read instructions in split transaction systems, which include a read request and a read address, can be processed by the memory controller immediately without any stall period.

Split transactions enhance memory access efficiency by allowing a memory system to initiate a memory write instruction, gather the necessary corresponding write data from any of a number of sources, and complete processing of the memory write instruction when the requisite write data is subsequently received. However, because memory access operations are typically executed in sequence to preserve data integrity, subsequent memory access instructions which are complete and ready for execution, including read instructions, must generally wait for execution of preceding split write instructions which cannot be executed until the requisite write data is received by the memory controller. This blocking of subsequent memory access instructions pending receipt of write data corresponding to a previously received split write instruction represents a significant inefficiency in conventional split transaction memory control systems.

What is needed is a mechanism for further improving the efficiency and throughput of memory controllers which process a sequence of split memory access instructions wherein data integrity is preserved.

SUMMARY OF THE INVENTION

In accordance with principles of the present invention, incomplete write instructions in a split transaction memory system are stored in a sideline buffer. A memory controller receives read instructions and split write instructions from a processor. A split write instruction includes a write address, a write request which identifies the instruction as a write instruction, and write data. In a split write instruction, the write address and write request can be provided to the memory controller in an initial transaction while the write data can be provided to the memory controller in a subsequent transaction.

The memory controller includes a main first in, first out memory device (main FIFO), a sideline buffer, and memory control logic. Under control of the memory control logic, the main FIFO receives and stores a sequence of split memory access instructions. The memory controller logic queues complete write instructions onto the main FIFO and retrieves the complete instructions from the main FIFO for execution in sequence. Also under control of the memory control logic, the sideline buffer temporarily stores incomplete write instructions. In accordance with principles of the present, the memory controller receives an incomplete write instruction and stores the incomplete write in the sideline buffer pending receipt of write data which completes the incomplete write instruction. Subsequently received memory access instructions which are complete and which do not conflict with the incomplete write instruction, i.e., which do not access any memory location also accessed by the incomplete write instruction, are queued onto the main FIFO for immediate execution out of sequence with respect to the incomplete write instruction. By executing the memory access instructions out of sequence, a stall period of delay is avoided, thereby improving performance and throughput of the memory system. In addition, by ensuring that no conflict is present between the complete memory access instruction and the incomplete write instruction stored in the sideline buffer, data integrity is ensured. In this way, a memory controller according to principles of the present invention achieves faster execution of sequential split memory access instructions while maintaining data integrity.

If a memory access conflict with the incomplete write instruction is detected in a subsequently issued complete memory access instruction, execution of the complete memory access instruction is postponed until the incomplete write instruction is completed and executed. Accordingly, a stall period of delay can occur when necessary to ensure data integrity. However, other complete memory access instructions which do not conflict with the incomplete write instruction and which are issued prior to the conflicting complete memory access instruction can be processed prior to completion of the incomplete write instruction and prior to postponement of processing of the conflicting memory access instruction.

When the write data of the incomplete write instruction stored in the sideline buffer is received, the write data is combined with the incomplete write instruction to form a complete write instruction which is moved from the sideline buffer to the main FIFO for processing. Any other memory access instructions which conflict with the previously incomplete write instruction are then ready for immediate processing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of embodiments of the present invention, numerous specific details are set forth in order to provide a thorough understanding of the present invention. However, it will be obvious to one skilled in the art that the present invention can be practiced without these specific details or by using alternate elements or processes. In other instances well known processes, procedures, components, and circuits have not been described in detail so as not to unnecessarily obscure aspects of the present invention.

Figure 1:
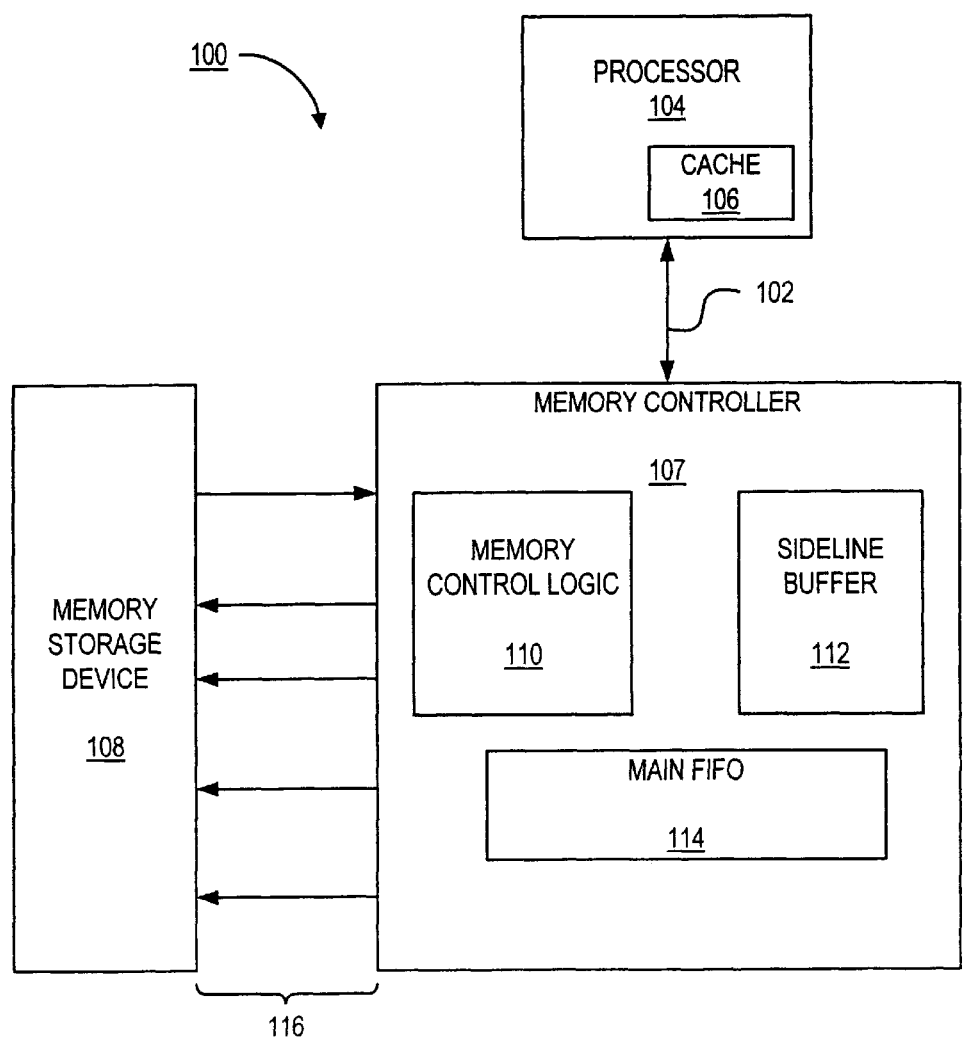
FIG. 1 is a block diagram of a memory controller including a sideline buffer according to the present invention for fast processing of memory access instructions in a split transaction memory system.

In accordance with the present invention, a memory controller 107 (FIG. 1) includes a sideline buffer 112 for storing incomplete write instructions while subsequently received non-conflicting complete memory access instructions can be queued ahead of such incomplete write instructions onto a main FIFO 114 for processing. As shown in FIG. 1, memory controller 107 is a part of a memory system 100. In memory system 100, a synchronous interconnect 102 provides communication of memory access instructions and data between a processor 104 and a memory controller 107. Processor 104 includes a cache memory 106. In one embodiment, processor 104 is a SPARC processor available from Sun Microsystems, Inc. of Mountain View, Calif. Additional interconnects 116 are also provided for communication of data and control signals between memory controller 107 and a memory storage device 108. Memory storage device 108 can include, without limitation, a randomly accessible memory (RAM) device and storage devices which include storage media such as magnetic and/or optical disks. In an embodiment of the present invention, memory storage device 108 is a dynamic RAM (DRAM). Processor 104, synchronous interconnect 102, and memory system 100 can be components of a computer system such as the SPARCstation workstation computer system available from Sun Microsystems, Inc. of Mountain View, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Memory controller 107 includes memory control logic 110, sideline buffer 112, and main FIFO 114. Memory controller 107 receives and processes memory access instructions from processor 104. Such memory access instructions can include split write instructions and read instructions.

A split write instruction includes a write request, which identifies the instruction as a write instruction, a write address range which specifies a range of memory location within memory storage device 108, and write data to be stored at the range of memory location specified by the write address range. In an embodiment of the present invention, processor 104 can issue split write instructions to memory controller 107 in two parts. The first part of a split write instruction includes the write request and the write address range. The second part of a split write instruction, which can be issued at a time subsequent to the issuance of the first part, includes the write data. The write data can be accessed from cache 106 of processor 104, or from another memory source, at the command of processor 104. Once accessed, the processor 104 provides the write data to memory controller 107. Memory controller 107 can also receive and process complete write instructions in which the write request, write address range, and write data are all received by memory controller 107 in a single transaction across synchronous interconnect 102. Memory read instructions processed by memory controller 107 generally include a read request, which identifies the instruction as a read instruction, and a read address range. The read address range specifies a range of memory locations within memory storage device 108 from which to retrieve data. Memory controller 107 receives read instructions in a complete form in a single transaction across synchronous interconnect 102.

Memory controller 107 can process all complete memory access instructions, i.e., all complete write instructions and all read instructions, without requiring further information from processor 104. However, memory controller 107 cannot process an incomplete write instruction until the write instruction is complete, i.e., until corresponding write data arrives. For example, memory controller 107 can process a read instruction by reading data from the specified read address in memory storage device 108 as soon as the read instruction arrives. In contrast, an incomplete write instruction, e.g., a write request and write address range without write data, cannot be processed by memory controller 107 until the corresponding write data is received from processor 104. Accordingly, a significant delay, sometimes referred to herein as a stall period, can elapse between receipt of the incomplete write instruction and the corresponding write data. However, memory controller 107 uses sideline buffer 112 to store incomplete write instructions such that subsequently received non-conflicting memory access instructions can be processed during the stall period for the incomplete write instruction.

Figure 3:
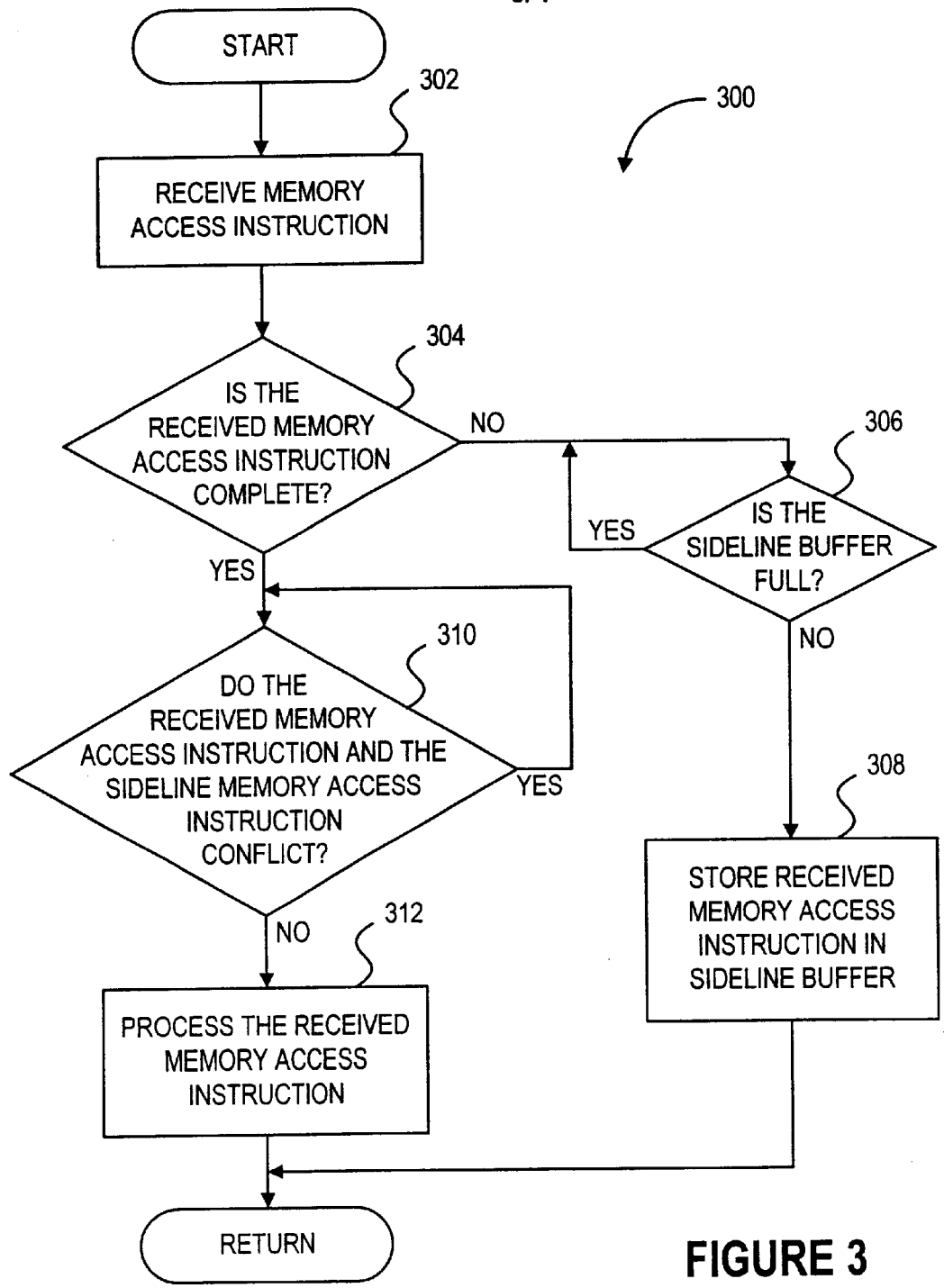
FIG. 3 is a logic flow diagram of a process for receiving and initial processing of a memory access instruction in a split transaction memory system in accordance with principles of the present invention.

Memory controller 107 processes received memory access instructions according to logic flow diagram 300 (FIG. 3) in which processing begins with step 302. In step 302, memory controller 107 (FIG. 1) receives a memory access instruction. In one embodiment, memory control logic 110 processes memory access instruction as they are received by memory controller from processor 104 and prior to queuing received memory access instructions onto main FIFO 114. In an alternative embodiment, memory control logic 110 processes memory access instructions as they are dequeued from main FIFO 114 after all previously received memory access instructions have been processed. In either case, the memory access instruction processed by memory control logic 110 in the steps of logic flow diagram 300 (FIG. 3) is referred to herein as the subject memory access instruction.

In step 304 (FIG. 3), to which processing proceeds from step 302, memory control logic 110 (FIG. 1) of memory controller 107 determines whether the subject memory access instruction is complete. The subject memory access instruction is complete if (i) the subject memory access instruction is a read instruction as indicated by a read request and includes a read address range or (ii) the subject memory access instruction is a write instruction as indicated by a write request and includes a write address range and write data. If memory control logic 110 determines that the subject memory access instruction is complete, processing transfers to test step 308 (FIG. 3) which is described below. Conversely, if memory control logic 110 (FIG. 1) determines that the subject memory access instruction is incomplete, processing transfers from test step 304 (FIG. 3) to test step 306.

Figure 2:
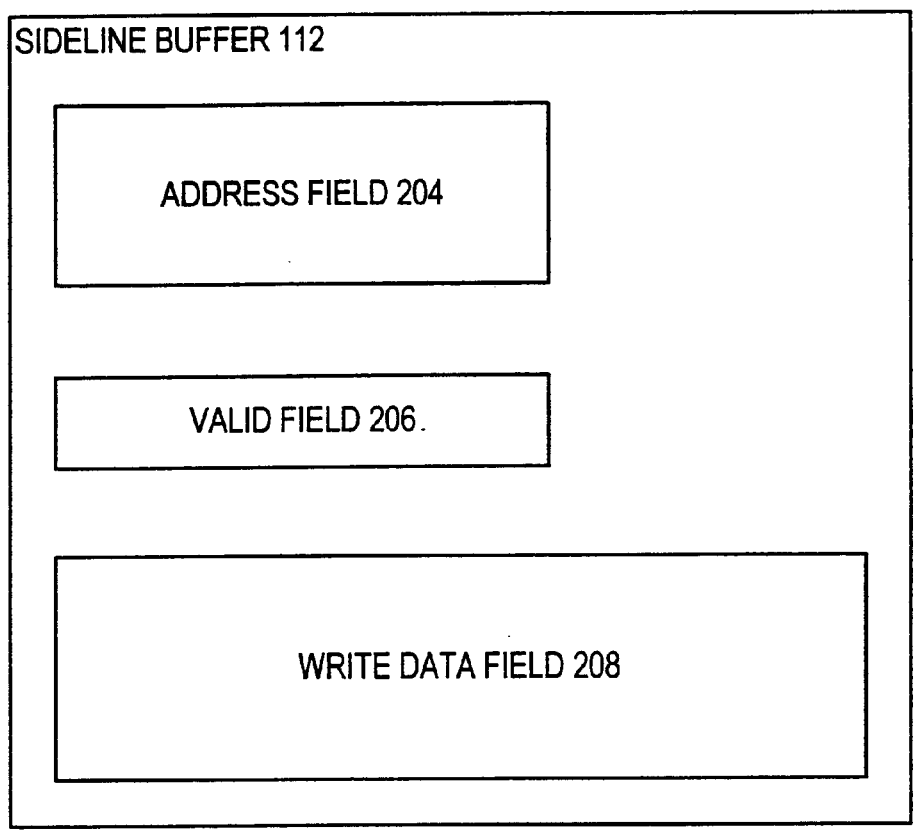
FIG. 2 is a block diagram of an embodiment of a structure of the sideline buffer of FIG. 1 for storing incomplete memory access instructions in accordance with principles of the present invention.

In test step, memory control logic 110 (FIG. 1) determines whether sideline buffer 112 is available for storage of an incomplete write instruction. Memory control logic 110 makes such a determination by comparison of data stored in a valid field 206 (FIG. 2) of sideline buffer 112 to data indicating that sideline buffer is available for storage of a memory access instruction. Sideline buffer 112 and valid field 206 are described more completely below. If sideline buffer 112 is not available for storage of an incomplete write instruction, processing transfers back to test step 306. Processing of the subject memory access instruction is thus stalled until sideline buffer 112 is available for storage of the subject memory access instruction. Conversely, if sideline buffer 112 is available for storage of an incomplete write instruction, processing transfers from test step 306 (FIG. 3) to step 308.

In step 308, memory control logic 110 (FIG. 1) stores the subject memory access instruction, which is determined to be an incomplete write instruction as described above in the context of test step 304 (FIG. 3), in sideline buffer 112 (FIG. 1). Sideline buffer 112 is shown in greater detail in FIG. 2. Sideline buffer 112 includes fields 204–208 for storing a memory access instruction and corresponding memory access instruction description data. Fields 204–208 include an address field 204, a valid field 206, and a write data field 208. Each of fields 204–208 stores data which collective specify a particular piece of information regarding a memory access instruction.

Address field 204 stores data specifying a memory address range of memory storage device 108 which is a destination address range for a particular write instruction. Valid field 206 stores data specifying a valid tag indicating whether the corresponding memory access instruction is valid. Specifically, data stored in valid field 206 indicates whether sideline buffer 112 stores a memory access instruction or is available for storage of a memory access instruction. Write data field 208 allocates space for storage of write data when such write data is subsequently received to complete an incomplete write instruction stored in sideline buffer 112.

In the source of loading the subject memory access instruction into sideline buffer 112 (FIG. 1) in step 308 (FIG. 3), memory control logic 110 (FIG. 1) (1) stores the write address specified by the subject memory access instruction into address field 204 (FIG. 2) and (2) sets the valid tag in corresponding valid field 206 (FIG. 2) to indicate that sideline buffer 112 contains a valid memory access instruction.

Figure 4:
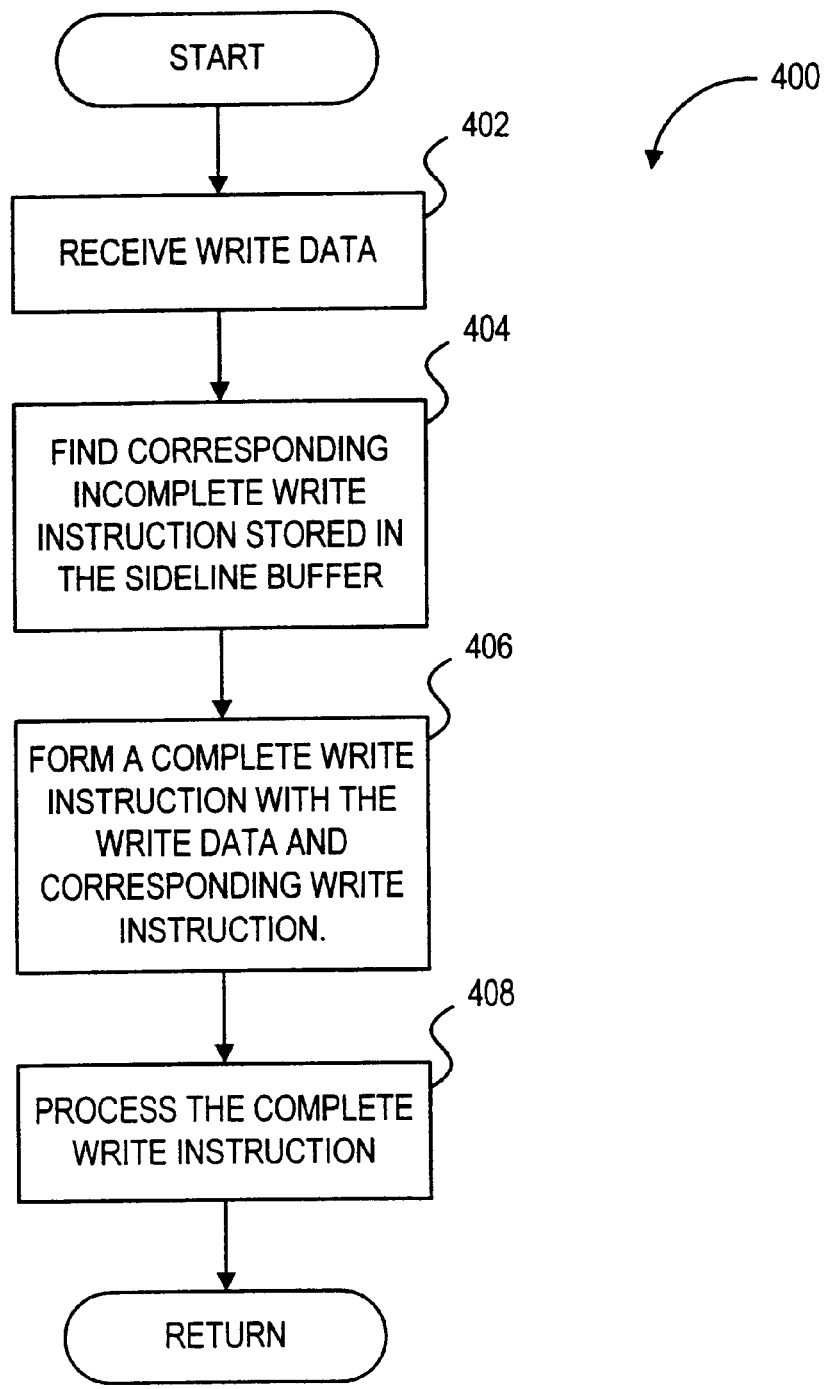
FIG. 4 is a logic flow diagram of a process for receiving memory write data corresponding to an incomplete split write instruction which has been stored in a sideline buffer in a split transaction memory system in accordance with principles of the present invention.

After step 308 (FIG. 3), processing according to logic flow diagram 300 completes. Thus, if the subject memory access instruction is an incomplete write instruction, the incomplete write instruction is not processed but is instead stored in sideline buffer 112 (FIG. 1) until the requisite write data is subsequently received by memory controller 107. The processing of memory controller 107 upon receipt of write data corresponding to a previously received incomplete write instruction is processed according to logic flow diagram 400 (FIG. 4) which is described more completely below. It should be noted that subsequently received memory access instructions can be processed by memory control logic 110 (FIG. 1) according to logic flow diagram 300 (FIG. 3) prior to receipt of the requisite write data to complete an incomplete write instruction.

If, in test step 304 (FIG. 3), memory control logic 110 (FIG. 1) determines that the subject memory access instruction is complete, processing transfers from step 304 (FIG. 3) to test step 310. In test step 310, memory controller 110 (FIG. 1) determines if the subject memory access instruction conflicts with any memory access instruction stored in sideline buffer 112, which is sometimes referred to herein as the sideline memory access instruction. Since a sideline memory access instruction is stored in sideline buffer 112 in a previous performance of the steps of logic flow diagram 300 (FIG. 3), it is important to verify that there is no conflict between the subject memory access instruction and the sideline memory access instruction as a prerequisite to processing of the subject memory access instruction before processing of the sideline memory access instruction. Such preserves data integrity.

Memory control logic 110 (FIG. 1) determines whether the subject memory access instruction conflicts with the sideline memory access instruction by comparison of the write address range of the sideline memory access instruction with the address range of the subject memory access instruction. The address range of the subject memory access instruction is a read address range if the subject memory access instruction is a read instruction and is a write address range if the subject memory access instruction is a write instruction. In comparing the respective address ranges, memory control logic 110 determines whether one or more memory addresses are common to both address ranges. Therefore, in test step 310 (FIG. 3), memory logic 110 (FIG. 1) determines if the subject memory access instruction conflicts with the sideline memory access instruction by determining whether the respective address ranges share one or more addresses.

If in test step 310 (FIG. 3), memory control logic 110 (FIG. 1) determines that the subject memory access instruction conflicts with the sideline memory access instruction, processing according to logic flow diagram 300 repeatedly performs test step 310 or otherwise waits until the incomplete write instruction stored in sideline buffer 112 is completed and processed. After the write instruction stored in sideline buffer 112 is completed and processed, the subject memory access is no longer in conflict with the sideline memory access instruction and processing according to logic flow diagram 300 (FIG. 3) proceeds to step 312 which is described below. If, in test step 310, memory control logic 110 (FIG. 1) determines that the subject memory access instruction does not conflict with the sideline memory access instruction, processing according to logic flow diagram 300 (FIG. 3) proceeds from test step 310 to step 312.

In step 312 (FIG. 3), memory control logic 110 (FIG. 1) processes the subject memory access instruction. In the illustrative embodiment in which memory controller 107 receives the subject memory access instruction in step 302, memory control logic 110 processes the subject memory access instruction in step 312 by queuing the subject memory access instruction onto main FIFO 114 for subsequent processing which includes effecting the data transfer within memory storage device 108 in accordance with the subject memory access instruction. In the alternative embodiment in which the subject memory access instruction is dequeued from main FIFO 114 in step 302, memory control logic 110 (FIG. 1) processes the subject memory access instruction by effecting the data transfer within memory storage device 108 in accordance with the subject memory access instruction.

Thus, the subject memory access instruction, which is received by memory controller 107 subsequently to receipt of the sideline memory access instruction, is processed prior to the sideline memory access instruction if the subject and sideline memory access instruction are not in conflict. As a result, processing of non-conflict read instructions is not postponed pending completion of a previously received incomplete write instruction. Accordingly, significant improvement in memory access instruction processing and throughput is realized according to the present invention.

Memory controller 107 possesses write data received from processor 104 through synchronous interconnect 102 as shown in logic flow diagram 400 (FIG. 4) in which processing begins with step 402. In step 402, memory control logic 110 (FIG. 1) receives write data. From step 402 (FIG. 4), processing transfers to step 404 in which memory control logic 110 (FIG. 1) finds a previously received incomplete write instruction which is stored in sideline buffer 112 and to which the current received write data corresponds.

In step 406 (FIG. 4), memory control logic 110 (FIG. 1) forms a complete write instruction by combining the received write data and the incomplete write instruction found to correspond to the received write data. Processing transfers to step 408 (FIG. 4) in which memory control logic 110 (FIG. 1) processes the newly completed sideline memory access instruction in the manner described above in conjunction with step 312 (FIG. 3). In addition, after step 408 (FIG. 4), any memory access instructions stalled in test steps 306 and/or 310 pending processing of the sideline memory access instruction are released. Specifically, any incomplete write instruction stalled in test step 306 is stored in sideline buffer 112 in step 308, and any complete memory access instruction which is in conflict with the sideline memory access instruction and is therefore stalled in test step 310 is processed in step 312 as described above.

By using sideline buffer 112 to temporarily store incomplete write instructions, processing of subsequently issued memory access instructions can continue as long as such subsequently issued memory access instructions are not in conflict with the sideline memory access instruction. Use of sideline buffer 112 in the manner described above substantially improves performance and memory access throughput of a memory controller in a split transaction system.

The above description is illustrative only and is not limiting. The present invention is limited only by the claims which follow.

What is claimed is:

1. A method for processing memory access instructions in a computer which includes a memory, the method comprising:

receiving a first memory access instruction which represents a first access of data within the memory at a first range of memory addresses;

determining that the first memory access instruction is incomplete;

storing the first memory access instruction in a sideline buffer;

receiving a second memory access instruction which represents a second access of data within the memory at a second range of memory addresses;

processing the second memory access instruction to effect the second access of data within the memory at the second range of memory addresses;

receiving data which completes the first memory access instruction;

combining the received data with the first memory access instruction to form a complete memory access instruction; and processing the complete memory access instruction to effect the first access of data within the memory at the first range of memory addresses.

2. The method of claim 1 wherein the first memory access instruction is a write instruction which represents storage of data within the memory; and further wherein the data which completes the first memory access instruction is write data.

3. The method of claim 1 wherein the second memory access instruction is a read instruction.

4. The method of claim 1 wherein the second memory access instruction is a complete write instruction.

5. The method of claim 1 wherein the step of processing the second memory access instruction comprises:
   determining whether the first and second ranges of memory addresses share one or more common memory addresses;
   upon a condition in which the first and second ranges of memory addresses share one or more memory addresses, postponing the step of processing the second memory access instruction until after performance of the step of processing the first memory access instruction; and
   upon a condition in which the first and second ranges of memory addresses share no common memory addresses, performing the step of processing the second memory access instruction prior to performance of the step of processing the first memory access instruction.

6. The method of claim 1 wherein the step of storing the first memory access instruction in the sideline buffer comprises:
   determining that the sideline buffer is full with one or more other incomplete memory access instructions; and
   postponing storage of the first memory access instruction in the sideline buffer until one or more of the incomplete memory access instructions is completed and retrieved from the sideline buffer.

7. A computer readable medium useful in association with a computer which includes a processor and a memory, the computer readable medium including computer instructions which are configured to cause the computer to process memory access instructions by performing the steps of:
   receiving a first memory access instruction which represents a first access of data within the memory at a first range of memory addresses;
   determining that the first memory access instruction is incomplete;
   storing the first memory access instruction in a sideline buffer;
   receiving a second memory access instruction which represents a second access of data within the memory at a second range of memory addresses;
   processing the second memory access instruction to effect the second access of data within the memory at the second range of memory addresses;
   receiving data which completes the first memory access instruction;
   combining the received data with the first memory access instruction to form a complete memory access instruction; and
   processing the complete memory access instruction to effect the first access of data within the memory at the first range of memory addresses.

8. The computer readable medium of claim 7 wherein the first memory access instruction is a write instruction which represents storage of data within the memory; and further wherein the data which completes the first memory access instruction is write data.

9. The computer readable medium of claim 7 wherein the second memory access instruction is a read instruction.

10. The computer readable medium of claim 7 wherein the second memory access instruction is a complete write instruction.

11. The computer readable medium of claim 7 where the step of processing the second memory access instruction comprises:
    determining whether the first and second ranges of memory addresses share one or more common memory addresses;
    upon a condition in which the first and second ranges of memory addresses share one or more memory addresses, postponing the step of processing the second memory access instruction until after performance of the step of processing the first memory access instruction; and
    upon a condition in which the first and second ranges of memory addresses share no common memory addresses, performing the step of processing the second memory access instruction prior to performance of the step of processing the first memory access instruction.

12. The computer readable medium of claim 7 wherein the step of storing the first memory access instruction in the sideline buffer comprises:
    determining that the sideline buffer is full with one or more other incomplete memory access instructions; and
    postponing storage of the first memory access instruction in the sideline buffer until one or more of the incomplete memory access instructions is completed and retrieved from the sideline buffer.

13. A computer system comprising:
    a processor;
    a memory; and
    a memory controller which is operatively coupled between the processor and the memory and which processes memory access instructions by performing the steps of:
    receiving from the processor a first memory access instruction which represents a first access of data within the memory at a first range of memory addresses;
    determining that the first memory access instruction is incomplete; storing the first memory access instruction in a sideline buffer;
    receiving from the processor a second memory access instruction which represents a second access of data within the memory at a second range of memory addresses;
    processing the second memory access instruction to effect the second access of data within the memory at the second range of memory addresses;
    receiving data which completes the first memory access instruction;
    combining the received data with the first memory access instruction to form a complete memory access instruction; and
    processing the complete memory access instruction to effect the first access of data within the memory at the first range of memory addresses.

14. The computer system of claim 13 wherein the first memory access instruction is a write instruction which represents storage of data within the memory; and further wherein the data which completes the first memory access instruction is write data.

15. The computer system of claim 13 wherein the second memory access instruction is a read instruction.

16. The computer system of claim 13 wherein the second memory access instruction is a complete write instruction.

17. The computer system of claim 13 wherein the step of processing the second memory access instruction comprises:
    determining whether the first and second ranges of memory addresses share one or more common memory addresses;

upon a condition in which the first and second ranges of memory addresses share one or more memory addresses, postponing the step of processing the second memory access instruction until after performance of the step of processing the first memory access instruction; and upon a condition in which the first and second ranges of memory addresses share no common memory addresses, performing the step of processing the second memory access instruction prior to performance of the step of processing the first memory access instruction.

18. The computer system of claim 13 wherein the step of storing the first memory access instruction in the sideline buffer comprises:

determining that the sideline buffer is full with one or more other incomplete memory access instructions; and postponing storage of the first memory access instruction in the sideline buffer until one or more of the incomplete memory access instructions is completed and retrieved from the sideline buffer.

* * * * *